Nov. 27, 1951  C. G. HÅRD AF SEGERSTAD  2,576,221
PNEUMATIC GAUGE FOR MEASURING DIMENSIONS OR FORCES
Filed Dec. 29, 1949
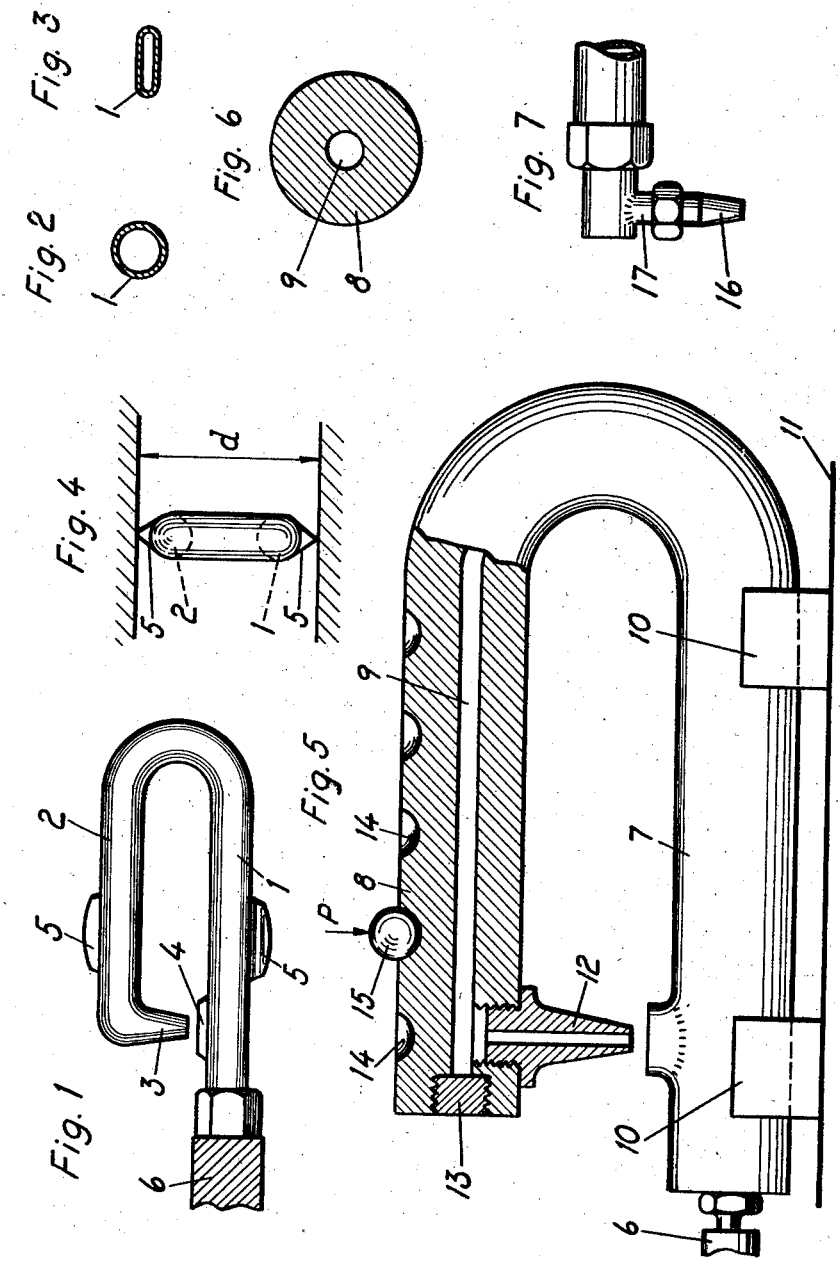
Inventor
Carl Gustaf Hård af Segerstad
by Sommers & Young
Attorneys Patented Nov. 27, 1951

2,576,221

UNITED STATES PATENT OFFICE 2,576,221

PNEUMATIC GAUGE FOR MEASURING DIMENSIONS OR FORCES

Carl Gustaf Hård af Segerstad, Sandviken, Sweden, assignor to Sandvikens Jernverks Aktiebolag, Sandviken, Sweden Application December 29, 1949, Serial No. 135,594
In Sweden December 30, 1948

2 Claims. (Cl. 73—141)

This invention relates to a pneumatic gauge for measuring dimensions or forces.

The chief object of the invention is to provide a simple yet very accurate gauge operated by compressed air.

The invention consists in a U-shaped yoke, made of a resilient tube, one branch of which has a jet whose outlet opening is controlled by a surface connected to the other branch of the yoke, which is connected to or adapted to be connected to a pressure medium source through a restricted passage and additionally to a pressure sensitive device.

Other objects and purposes will be apparent from the following specification when read in connection with the accompanying drawing in which a preferred embodiment of the invention is illustrated by way of example.

Fig. 1 is a side elevation of a gauge according to the invention.

Figs. 2 and 3 are sections of the gauge shown in Fig. 1.

Fig. 4 illustrates the gauge being applied in practice.

Fig. 5 is a view of a force meter according to the invention and Fig. 6 is a section through the same.

Fig. 7 is a view of an embodiment of a jet.

The gauge shown in Figs. 1 through 4 consists of a resilient tube 1 of any suitable cross-section, e. g. annular or flattened as illustrated in Figs. 2 and 3 respectively. The tube is bent back so as to form a substantially U-shaped yoke the two branches of which are designated by 1 and 2 respectively. The left hand end of the upper branch 2 of the yoke is bent downwards and has the form of a jet 3. Opposite to this jet the lower branch 1 is provided with a plain raised portion 4. The sides of the branches 1 and 2 remote from each other are provided with protuberances or rims 5 forming measuring edges or cams. The lower branch 1 is connected to a hose 6 for the purpose of supplying constant pressure medium, e. g. air. Fig. 4 illustrates how to use the gauge for measuring the diameter of a bore in work piece. If the diameter $d$ is less than the distance between the measuring edges 5 the yoke will be compressed and followingly the distance or gap between the jet 3 and the plain surface reduced, resulting in increased discharge flow resistance and likewise increased pressure in the tube and the hose 6, whereby a pressure sensitive instrument is actuated. Said instrument may be adapted to indicate the measure value of the diameter $d$ or to give readings when certain dimension limits are passed.

The yoke of the force meter shown in Figs. 5 and 6 consists of a strong tube 7, 8 with thick walls and a comparatively small canal 9. A cross section thereof is shown in Fig. 6. The lower branch 7 is mounted in supports 10 resting on a ground 11. In threaded engagement with the wall of the branch 8 is a jet 12 and in the end of the same branch is inserted a tightening plug 13.

The upper side of the branch 8 is provided with a number of notches 14 having the form of spherical segments. 15 designates a steel ball on which the pressure P to be measured is to be applied. By placing the pressure ball 15 in different notches 14 various measure ranges can be obtained. For the purpose of measuring tensile forces the force meter may be provided with recesses, e. g. shaped as transversal grooves, arranged on the sides of the branches facing each other. These grooves may likewise correspond to various measure ranges and rings, hooks, or the like may be inserted therein for transmitting the tensile forces to be measured. Fig. 7 illustrates an embodiment of the jet, in this case designated by 16 and mounted on a tube piece 17 fastened to the yoke by welding.

Having now described my invention, what I claim as new and desire to secure by Letters Patent is:

1. A pneumatic gauge comprising a U-shaped yoke, made of a resilient tube, one branch of which is provided with a jet whose outlet opening is controlled by a surface on the other branch of the yoke, said other branch being connected to a constant pressure medium source through a restricted passage and additionally to a pressure sensitive device, the first-mentioned branch being provided with notches in which forces to be measured are to be applied, said notches being arranged for various measure ranges.

2. A pneumatic gauge, comprising a U-shaped yoke, made of a resilient tube, one branch of which is provided with a jet whose outlet opening is controlled by a surface on the other branch of the yoke, said other branch being connected to a constant pressure sensitive device, the first-mentioned branch being provided with notches having the form of spherical segments so as to receive balls onto which forces to be measured are to be applied said notches being arranged for various measure ranges, and supports for bearing the yoke in a vertical plane.

CARL GUSTAF HÅRD AF SEGERSTAD.

REFERENCES CITED

The following references are of record in the file of this patent:

UNITED STATES PATENTS

| Number | Name | Date |
|---|---|---|
| 2,112,252 | Sang | Mar. 29, 1938 |
| 2,455,285 | Versaw | Nov. 30, 1948 |